United States Patent Office 3,817,922
Patented June 18, 1974

3,817,922
ADHESIVE COMPOSITIONS
Bruce P. Barth, Somerville, N.J., assignor to Union
Carbide Corporation, New York, N.Y.
No Drawing. Filed Nov. 18, 1971, Ser. No. 200,170
Int. Cl. C08d 9/10; C08g 31/16, 37/14
U.S. Cl. 260—53 R
4 Claims

ABSTRACT OF THE DISCLOSURE

The invention relates to a solution of the exothermic reaction product of an oil-soluble, heat-reactive phenol-formaldehyde resin, zinc oxide and ammonia, which when provided with neoprene forms a homogeneous mixture therewith. The homogeneous mixture can be employed as adhesive cements having excellent peel strengths, tack times and hot strengths.

---

There is described in U.S. Pat. No. 2,610,910, the use of phenolic resins, that is, phenolformaldehyde resins, in neoprene rubber compounds to produce what is called "adhesive cements." Resulting from the technology disclosed in that patent developed a substantial industry in which phenolic resins have been extensively employed in combination with neoprene to produce what is classified as contact cements. The phenolic is added to the neoprene for the main purposes of improving the tack of the adhesive, its shelf-life, its elevated temperature properties and the adhesion of the adhesive to various substrates. In U.S. Pat. No. 2,918,442, patented Dec. 22, 1959, and in U.S. Pat. No. 3,044,976, patented June 17, 1962, there are described the inclusion in such adhesives of metal oxides and hydroxides for the purposes of enhancing the various properties characterized above. These metals, in their oxide or hydroxide forms, form a soluble complex with the phenolic resin which can be easily incorporated into the neoprene compound. The most widely used metal oxide for forming such a complex is magnesium oxide. It is added to the phenolic resin with a small amount of water to effect the complexing reaction within a relatively short period of time, say, for example, within two to sixteen hours at room temperature.

The development of the use of metal oxides in phenol-formaldehyde modified neoprene adhesives, as well as the general techniques in formulating such adhesives, the composition of the phenol-formaldehyde resins, the properties of the neoprene elastomers per se, as well as the variety of information which has been gathered by the art in the utilization of such adhesives in noncommercial and commercial practices is only partially reflected by the following literature:

U.S. Pat. No. 3,124,548, patented Mar. 10, 1964
U.S. Pat. No. 3,308,087, patented Mar. 7, 1967
U.S. Pat. No. 3,394,099, patented July 23, 1968
U.S. Pat. No. 3,427,268, patented Feb. 11, 1969
U.S. Pat No 3,595,821, patented July 27, 1971
Belgian Pat. No. 723,782.

It is not intended herein to repeat knowledge which is already possessed by those having ordinary skill in this art, nor to review the history of this art, except as such pertains to this invention.

As indicated above, phenolic resins contribute a variety of desirable properties to neoprene based adhesives. Three significant factors in the utility of such adhesives are peel strength, the ability of the adhesive to not creep or flow under high temperature conditions when being employed as an adhesive (called "hot strength"), and the ability of the adhesive to remain tacky for a sufficient length of time ("tack time") so as to be useable under normal application conditions. Each type of phenolic resin which is employed in making adhesives contributes uniquely to each of these properties. The same holds true with the various metal oxides or metal hydroxides which are described in the art to be employed in such adhesives. Furthermore, the art also recognizes that the certain combinations of phenolic resins and metal oxides and hydroxides contribute unique properties.

In U.S. Pat. No. 3,595,821, at column 1, lines 35–55, there is a discussion about a number of the above-mentioned properties required for neoprene adhesives. For example, the term "bonding range" of the patent is equivalent to the term "tack time," as stated above, and the term "heat resistance," of the patent, is the same as the above stated "hot strength."

Phenolic resins which are typically employed in neoprene adhesive formulations are generally made by the reaction of formaldehyde with a substituted phenol, particularly one which is substituted in the para position, such as para-tertiary butyl phenol and para-phenyl phenol. Usually, in the manufacture of these resins one employs an excess of the formaldehyde so as to produce in the resin reactive methylol groups and methylene ether units which interbond phenol moieties therein. These resins are characterized in the art as oil-soluble, heat-reactive phenol formaldehyde resins. Though the art has suggested a variety of metal oxides and metal hydroxides to be utilized with the phenol-formaldehyde resins, the predominant metal of choice is magnesium oxide. Most of the other metal oxides or hydroxides will result in providing a deficiency in one of the properties indicated above. For example, those metal oxides or hydroxides which will produce excellent hot strength properties to the adhesive typically provide extremely short tack times and, therefore, cannot be utilized in the usual commercial operation. In some cases, a metal oxide may provide good tack time, yet deleteriously affect the peel strength of the adhesive at elevated temperatures. Because magnesium oxide achieves a good balance in all three of the aforementioned properties, it has found a unique position in the neoprene adhesive field as the metal oxide complexing agent.

There is described herein a metal complexing system which when employed in phenolic resin containing neoprene adhesive compositions achieves, in essentially every instance, a better or increased hot strength than is obtainable from the use of magnesium oxide, yet, at the same time, does not deleteriously affect the tack time properties of the adhesive when compared to the same composition made instead with magnesium oxide. Thus, the metal complexing system of this invention does not compare unfavorably to the desirable properties once normally associates from the use of magnesium oxide, yet, at the same time, greatly enhances one of the most critical properties that is required of a neoprene adhesive, to wit, the adhesive's hot strength or creep resistance at high temperatures.

This invention relates to the utilization and the formation of a solution of the exothermic reaction product of an oil-soluble, heat-reactive, phenol-formaldehyde resin, zinc oxide, in particulate form, and ammonia. This solution, which may be solid or liquid, can be employed after its formation with neoprene rubber compositions or can be formed in situ with the neoprene rubber composition. In either case, the neoprene forms a homogeneous mixture with the formed solution. The neoprene adhesives formed from the aforementioned solution possess higher hot strength than is obtainable from the same resin combined with magnesium oxide in the conventional manners.

The amount of zinc oxide provided with the oil-soluble, heat hardenable phenolic resin may range as little as about .01 part of the ZnO to as much as about .25 parts of the ZnO for each part of the phenolic resin. In the neoprene adhesive composition, one may employ as little as about .05 part of the phenolic resin to as much as about 2 parts of the phenolic resin for each part of neoprene.

In forming the zinc oxide-ammonia complex, one need only mix zinc oxide particles in the phenolic resin and incorporate ammonia, either in gas form or in solution in water. One may alter this procedure by mixing the phenolic resin and the ammonia before admixing the zinc oxide. Also, one may mix the zinc oxide in aqueous ammonia and then combine that mixture with the phenolic resin.

In forming the zinc oxide-ammonia complex in the phenolic resin, one may employ as little as 0.1 mole of ammonia for each mole of zinc oxide to about 10 moles of ammonia for each mole of zinc oxide.

The phenolic resin comprises the reaction product of formaldehyde and a difunctional phenol compound, such as the para-substiuted phenols. Illustrative of para-substituted phenol are para-alkyl phenol where the alkyl group contains 1–12, inclusive, carbon atoms; p-tolyl-phenol, p-phenyl phenol; and para-cycloalkyl phenol (e.g., p-cyclohexylphenol). Particularly desirable para-substituted phenols are para-n.-propylphenol, para - n - butylphenol, para-n-amylphenol, para-n-octyl phenol, para-n-nonylphenol, para-i-propylphenol, para - i - butylphenol, para-i-amylphenol, para-t.-butylphenol, para-t.amylphenol and p.-phenylphenol. The phenolic resins are typically made with an alkaline catalyst and with at least one (1) mole of formaldehyde for each mole of the phenol.

The neoprene rubber composition suitable in making the adhesives of this invention is a polymer of 2-chloroprene or copolymer such as are described in U.S. Pats., Nos. 3,308,087 and 3,394,099, note particularly column 1, lines 57–68 of U.S. Pat. No. 3,394,099.

It is important to realize that the use of zinc oxide without ammonia will not achieve a neoprene adhesive composition possessing superior hot strength and tack times.

In the examples, the following tests were employed to characterize the invention:

*Tack Time*—Wet films of the test adhesives are applied to both glass and 50 lb. Kraft paper with a 10 mil draw-down bar. At two minute intervals ½″ strips of the coated paper are cut and laid film side down on the coated glass. These strips are applied using moderate fingertip pressure. They are stripped off immediately after they are applied. The time which had elapsed between the initial application of the wet adhesive to the two substrates and the final drying of the adhesive to the point where the coated paper no longer adheres to the coated glass is recorded as the tack time.

*Dead Load Hot Strength*—This test is designed to measure the resistance of an adhesive to flow under a sustained load (creep) at elevated temperature. Two canvas to steel shear specimens having a one square inch bonded area are prepared for each test adhesive. In preparing these specimens two coats of adhesive are applied to the canvas and one coat is applied to the steel surface. The coated surfaces are assembled while still tacky and pressed together with a ten pound roller. Specimens are aged for one week at room temperature before testing.

The specimens are tested by suspending them in an oven at 130° F. at a constant shear load of 1000 grams and 5 lbs. (one specimen representing each adhesive was tested at each load). The test assembly consisted of a series of clamps attached to the top of the oven; the steel portions of the specimens are secured by these clamps, and the 1000 gram and 5 lb. loads are then hooked into slots which are cut into the canvas portions of the specimens. The specimens are clamped in a verticle position so as to maintain a shear load on the adhesive joints. The oven temperature is increased 10° F. every 15 minutes until the bond fails or until a temperature of 300° F. is reached. The temperature at failure is recorded as the dead load hot strength.

*Peel Strength*—Canvas/canvas specimens are prepared by brush coating two 8″ x 1½″ strips of 10.1 oz. 54 x 42 weave army duck with each test adhesive. The canvas strips are given two coats of adhesive with a one hour air dry between coats. The strips are assembled while the second coat is still tacky and pressed together with a ten pound roller. The edges of the assembled strips are trimmed to give 1″ wide test specimens.

Canvas/steel specimens are prepared by adhering a 12″ x 1½″ strip of canvas to a 3″ x 6″ solvent cleaned cold rolled steel panel. The canvas is given two coats of adhesive and the steel is given one coat (at the same time that the second coat is applied to the canvas). The specimens are assembled, rolled and trimmed as described above.

Peel tests are conducted in a tensile machine at a rate of 1″ per minute. Bonds are tested one and three weeks after assembly. All bonds are aged at 73° F.; tests are conducted at the indicated temperature (73° F., 140° F.) after a 30 minute conditioning period.

The examples which follow serve to illustrate this invention and are not intended to restrict or limit this invention.

EXAMPLE 1

This example demonstrates the superiority of the resin/$ZnO/NH_3$ complex over the resin/MgA, the resin/MgO/$NH_3$, and the resin/ZnO complexes.

The following ingredients were weighed into glass jars and rolled for approximately 20 hours at room temperature:

|  | Parts by weight of— | | | |
| --- | --- | --- | --- | --- |
|  | 1 | 2 | 3 | 4 |
| Heat-reactive para-tertiary butyl phenol formaldehyde resin | 45 | 45 | 45 | 45 |
| Toluene/hexane/acetone,1/1/1 by weight | 45 | 45 | 45 | 45 |
| Zinc oxide | 5 | 5 | | |
| Magnesium oxide | | | 4 | 4 |
| 28% $NH_3$ in water | 12 | | | 12 |
| Water | | 1 | 1 | |

Polychloroprene rubber was compounded on a 2-roll mill with the following ingredients:

| | Parts by weight |
| --- | --- |
| Polychloroprene | 100 |
| Zinc oxide | 5 |
| Magnesium oxide | 4 |
| Phenyl-alpha-naphthylamine (antioxidant) | 1 |

It was then dissolved in equal amounts of toluene/hexane/acetone to a 25% rubber content. A quantity of this solution was added and blended with each of the resin solutions to yield adhesives with the rubber/resin weight ratios equal to 100/45. The adhesives were tested for dead load hot strength with the following results:

| Load | 1 | 2 | 3 | 4 |
| --- | --- | --- | --- | --- |
| 1,000 g | +300 | 200 | 160 | 160 |
| 5 lbs | +300 | 160 | 150 | 150 |

Peel strength and tack time data were obtained on systems 1 and 3. The results showed that system 1 containing the resin/$ZnO/NH_3$ complex had superior elevated temperature peel strength and equivalent room temperature peel strength and a tack time compared with system 3 containing the normal resin/MgO complex.

| Peel strength, lbs./in., after— | 1 | 3 |
| --- | --- | --- |
| 1 week at 73° F.: | | |
|   Tested at 73° F | 30 | 31 |
|   Tested at 180° F | 2 | 2 |
| 3 weeks at 73° F.: | | |
|   Tested at 73° F | 33 | 35 |
|   Tested at 180° F | 16 | 8 |
| Tack time, minutes | 54 | 54 |

EXAMPLE 2

This Examples shows the effectiveness of ammonia in increasing the reactivity of zinc oxide with resin.

The ingredients shown in the following table were rolled in glass jars for 3 days at room temperature (23° C.). Approximately 200 cc. toluene was added to each jar which was then centrifuged for one hour. The clear upper layer was decanted, dried, and tested for ash content to determine the amount of zinc that had reacted with the resin.

(25 weight percent based on the resin) until the opaque mixture became translucent indicating that most of the zinc oxide had reacted with the resin.

Various amounts of this resin were mixed with a 25 weight percent solution of neoprene rubber containing 4 parts MgO, 5 parts ZnO, and 2 parts antioxidant and tested for dead load hot strength. The results show the effectiveness of the resin/ZnO/$NH_3$ complex in providing high hot strength over a broad range of complex/neoprene ratios.

|  | Weight in grams | | | | |
|---|---|---|---|---|---|
|  | 1 | 2 | 3 | 4 | 5 |
| Phenolic resin (same as Ex. 1) | 26.7 | | | | |
| Toluene | 26.7 | | | | |
| Zinc oxide | 3.0 | | | | |
| 28% $NH_3$ in water | 17.0 | 7.4 | 4.0 | 1.0 | 0. |
| Color (after rolling 3 days) | Dark green | Grey-green | Light grey-green | Yellow-green | Light yellow. |
| Ash content, percent | 8.97 | 8.51 | 8.12 | 7.06 | 5.74. |
| Nitrogen content, percent (Kehldahl) | 0.44 | | 0.31 | | |

Nitrogen content was analyzed to determine whether the ammonia acts merely as a catalyst or whether it becomes part of the chelate. Two other chelates made with 7 and 5% zinc oxide analyzed for 0.99 and 0.79% N respectively (after drying 3 hours at 135° C. to remove residual ammonia).

EXAMPLE 3

In preparing a heat reactive p-phenylphenol-formaldehyde/ZnO/$NH_3$ reaction product, 255 grams of a 50% solution of heat reactive p-phenylphenol formaldehyde resin in toluene and 12.8 grams of zinc oxide were charged to a flask fitted with thermometer, reflux condenser and agitator. The starting temperature was 27° C. and the mixture was an opaque cream color. Agitation was started and $NH_3$ gas was bubbled continuously into the mixture. The temperature rose to 35° in 18 minutes at which point heat from an external mantel was applied. The temperature rose to 51° in another 25 minutes and was held at 49–51° for 75 minutes. At the end of this time, the mixture was clean and olive green in color, the clarity indicating that the ZnO had completely reacted with the resin.

Evaluation in a neoprene adhesive showed this resin to have a 5 lb. dead load hot strength value of 300+° F. whereas the control (p-phenylphenol resin reacted with MgO without $NH_3$) had a value of only 150° F. With a 1000 gram load the values were 300+ and 170° F. respectively.

EXAMPLE 4

This example shows the effectiveness of zinc oxide/ammonia as complexing agents for heat-reactive p-t-butyl phenol-formaldehyde resin used in amounts, based on neoprene rubber, varying from 35 to 100 parts.

A toluene solution of a heat-reactive p-t-butyl phenol-formaldehyde resin was reacted with zinc oxide (7 weight percent based on the resin) and 28% aqueous ammonia

| Parts complex/100 parts neoprene: | Dead load hot strength, 1000 g., ° F. |
|---|---|
| 35 | 300+ |
| 45 | 300+ |
| 55 | 300+ |
| 65 | 300+ |
| 75 | 300 |
| 100 | 300+ |

What is claimed is:

1. A solution formed by the exothermic reaction product of an oil-soluble, heat-reactive phenol-formaldehyde resin, and a complex of zinc oxide and ammonia.

2. The solution of claim 1 wherein the phenol is para-substituted.

3. The solution of claim 2 wherein the para-substituted phenol is para-t.-butyl phenol.

4. The solution of claim 2 wherein the para-substituted phenol is para-phenyl phenol.

References Cited

UNITED STATES PATENTS

| 3,086,951 | 4/1963 | Wile | 260—845 |
| 2,647,873 | 8/1953 | Bryant et al. | 260—53 |

FOREIGN PATENTS

| 1,186,705 | 4/1970 | Great Britain | 260—845 |
| 863,308 | 3/1961 | Great Britain | 260—845 |
| 575,988 | 5/1959 | Canada | 260—845 |

JOHN C. BLEUTGE, Primary Examiner

U.S. Cl. X.R.

156—333, 335; 260—32.8 R, 32.8 A, 33.6 R, 33.6 A, 45.9 P, 845

UNITED STATES PATENT OFFICE
CERTIFICATE OF CORRECTION

Patent No. 3,817,922          Dated June 18, 1974

Inventor(s) Bruce P. Barth

It is certified that error appears in the above-identified patent and that said Letters Patent are hereby corrected as shown below:

Column 3, line 18, "substiuted" should read -- substituted --.
Column 4, line 27, "MgA" should read -- MgO --.
Column 4, line 37, "bexane" should read -- hexane --.
Column 5, line 1, "Examples" should read -- Example --.
Column 6, Claim 1, pursuant to Paper No. 10 and the amendment filed November 21, 1973, should read -- 1. The solution of the exothermic reaction product of an oil-soluble, heat-reactive phenol-formaldehyde resin, about .01 part to about .25 part of zinc oxide for each part by weight of the resin and about 0.1 mole to about 10 moles of ammonia for each mole of zinc oxide. --

Signed and sealed this 8th day of October 1974.

(SEAL)
Attest:

McCOY M. GIBSON JR.
Attesting Officer

C. MARSHALL DANN
Commissioner of Patents